Oct. 14, 1969 W. WILHELMSEN 3,472,012
CABLE WINDING MACHINE WITH TRIANGULAR CENTRAL TUBE
Filed Dec. 4, 1967

INVENTOR.
WILLY WILHELMSEN

United States Patent Office 3,472,012
Patented Oct. 14, 1969

1

3,472,012
CABLE WINDING MACHINE WITH TRIANGULAR CENTRAL TUBE
Willy Wilhelmsen, Snaroya, Norway, assignor to International Standard Electric Corporation, New York, N.Y., a corporation of Delaware
Filed Dec. 4, 1967, Ser. No. 687,866
Claims priority, application Norway, Dec. 3, 1966, 165,860/66
Int. Cl. D01h 7/02; D07b 3/02; D02g 3/36
U.S. Cl. 57—65                    1 Claim

ABSTRACT OF THE DISCLOSURE

A machine for winding three conductors into a cable includes three payoff reels mounted symmetrically about a triangular central tube which permits closer spacing of the reels.

BACKGROUND OF THE INVENTION

Field of the invention

The present invention relates to a cable winding machine for laying up three conductors into a cable. A rotatable carriage has three cradles for payoff reels rotatable about their individual axes and mounted, angularly spaced by 120°, between two frames which are interconnected by a centrally arranged tube.

Description of the prior art

In conventional machines of this type the centrally arranged interconnecting tube has a cylindrical shape. The diameter of this tube is determined by the required stiffness of the machine. In large machines a cylindrical tube designed in accordance with this requirement would, however, result in a machine where the cradles are not mounted at a minimum distance from the machine axis.

SUMMARY OF THE INVENTION

The object of the present invention is to provide a cable winding machine where the required stiffness of the machine is maintained and where the cradles and payoff reels are mounted at a minimum distance from the machine axis.

The main feature of the present invention is that the interconnecting tube has a triangular shape, the sides of which face the respective cradle axis so that the cradle and payoff reels may be mounted at a minimum distance from the machine axis.

The above mentioned and other features of the present invention will become apparent from the following description, taken in conjunction with the drawing.

2

DESCRIPTION OF THE PREFERRED EMBODIMENT

Figure 1:
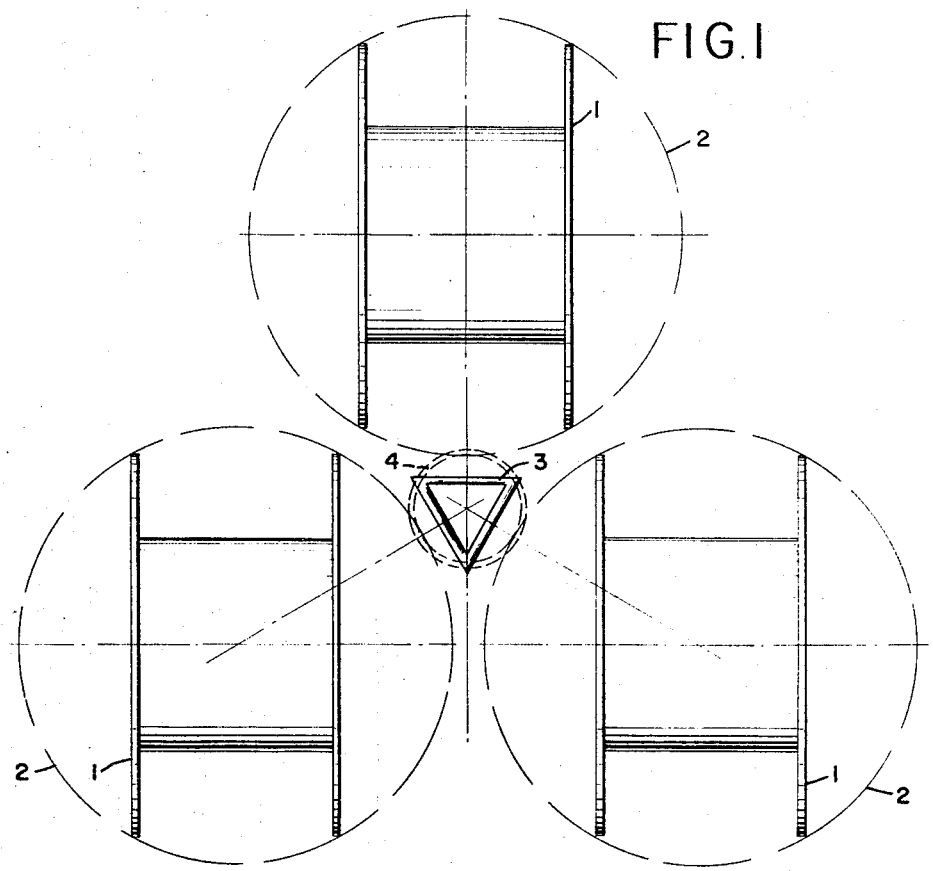
FIGURE 1 schematically shows an end view of the relationship of the payoff reels and interconnecting tube and, FIGURE 2 shows a top view of a portion of a cable winding machine including the invention.
Figure 2:
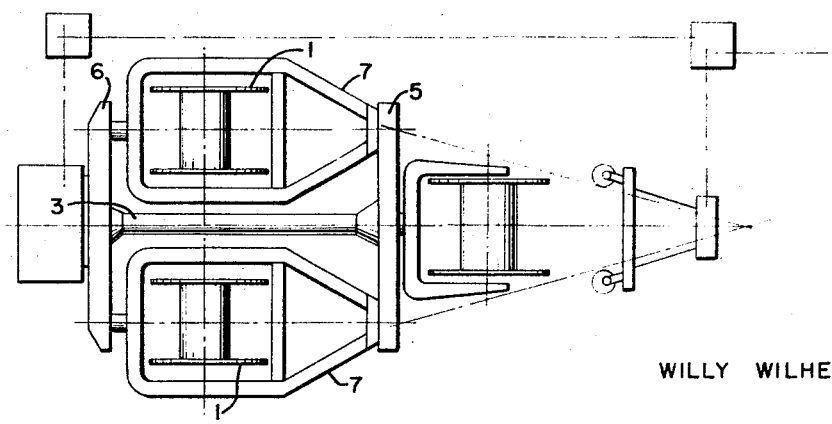

As shown in FIGURE 1, three payoff reels 1 for conductors are rotatable about individual axes within circles 2 in order to provide the conductors with a desired back-twist. In the center between the three reels is shown the cross-section of a centrally arranged triangular tube 3 interconnecting two rotatable frames 5, 6 of standard design, between which three reel cradles 7 of known form containing respective payoff reels are mounted. The frames and two of the cradles are shown in FIGURE 2. The cradles are positioned within circles 2 to support the reels. FIGURE 1 also indicates the outline of a circular tube 4 which is used in conventional machines. It is clear that the reels in such machines must be mounted at a greater distance from the machine axis, while the flat sides of the triangular tube facing the reel and cradle axes permit closer spacing.

What is claimed is:

1. In a cable winding machine for laying up three conductors into a cable and including a rotatable carriage having two frames interconnected by a centrally arranged tube, three cradles and respective conductor payoff reels therein, said cradles and reels being mounted between said frames symmetrically spaced by 120° about said central tube and being aranged to be rotated about their individual axes; the improvement wherein said interconnecting tube has a triangular shape the sides of which face the respective reel axes so that the reels are mounted at a minimum distance from the machine axis.

References Cited

UNITED STATES PATENTS 2,105,338  1/1938  Sunderland _____ 57—65 XR
2,857,731  10/1958  Simcoe _____ 57—64

MERVIN STEIN, Primary Examiner
WERNER H. SCHROEDER, Assistant Examiner

U.S. Cl. X.R.
57—13